3,000,886
SUBSTITUTED AROYLALKYL PHENOTHIAZINYL-ALKYL PIPERAZINES

William H. Edgerton, Strafford-Wayne, Maxwell Gordon, Philadelphia, and James W. Wilson, Wayne, Pa., assignors to Smith Kline & French Laboratories, Philadelphia, Pa., a corporation of Pennsylvania
No Drawing. Filed Oct. 6, 1958, Ser. No. 765,295
2 Claims. (Cl. 260—243)

This invention relates to novel substituted 1-aroylalkyl-4-(10-phenothiazinylalkyl)-piperazines which have a broad spectrum of utility as therapeutic agents in various animal organisms. More specifically, the compounds of this invention have utility as tranquilizers, antiemetics, sedatives, antihistaminics, anticonvulsants and potentiators of various central nervous system depressants, such as analgetics or anesthetics. Of particular importance are the tranquilizing and antiemetic activities of these compounds, especially the former activity which makes them suitable for the treatment of mental illness.

In addition, these compounds have chemotherapeutic or antimicrobial activity, such as antileprosy, antitubercular, antibacterial and antifungal activity. For example, they possess antifungal or antibacterial activity, such as against *Diplococcus pneumoniae* Type I, *Hemolytic streptococcus*, *Micrococcus pyogenes* var. *aureus*, *Klebsiella pnuemoniae* and *Candida albicans*. Those compounds containing a trifluoromethyl moiety are particularly advantageous. Further, these compounds have anthelmintic activity, such as against the Strongylinae subfamily.

The substituted 1-aroylalkyl-4-(10-phenothiazinylalkyl)-piperazines of this invention are represented by the following general formula:

Formula 1

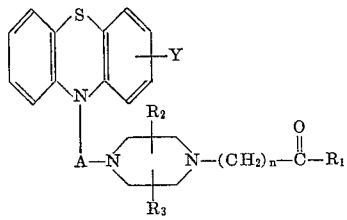

when:
Y represents hydrogen, chlorine, trifluoromethyl, methyl, methoxy, acetyl, methylmercapto, trifluoromethylmercapto, methylsulfonyl, trifluoromethylsulfonyl, or cyano;
A represents a divalent, straight or branched alkylene chain containing from 2 to 4 carbon atoms, separating the two nitrogens to which it is attached by at least two carbon atoms;
$n$ represents a positive integer of from 1 to 3;
$R_1$ represents phenyl, monomethoxy substituted phenyl or monomethyl substituted phenyl; and
$R_2$ and $R_3$ represent hydrogen, methyl or ethyl.

The Y moiety is preferably in the 2 position of the phenothiazine ring.

Advantageous compounds of this invention are represented by the following structural formula:

Formula 2

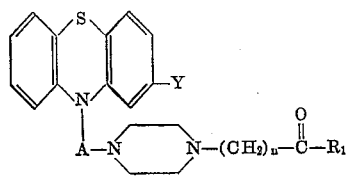

when:
Y represents chlorine, trifluoromethyl, methylmercapto, trifluoromethylmercapto, trifluoromethylsulfonyl, or cyano;
A represents a divalent, straight or branched alkylene chain containing from 2 to 4 carbon atoms, separating the two nitrogens to which it is attached by at least two carbon atoms;
$n$ represents a positive integer of from 1 to 3; and
$R_1$ represents phenyl, p-methoxyphenyl or p-tolyl.

Preferred compounds of this invention are represented by Formula 2 when:
Y represents trifluoromethyl;
A represents a divalent, straight or branched alkylene chain containing from 2 to 4 carbon atoms, separating the two nitrogens to which it is attached by at least two carbon atoms;
$n$ represents a positive integer of from 1 to 3; and
$R_1$ represents phenyl.

A particularly preferred and advantageous compound is 1-(2-benzoylethyl)-4-[3-(2-trifluoromethyl-10-phenothiazinyl)-propyl]-piperazine.

This invention also includes acid addition salts of the above defined bases formed with nontoxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Examples of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The novel substituted 1-aroylalkyl-4-(10-phenothiazinylalkyl)-piperazines of this invention are prepared according to the following synthetic scheme:

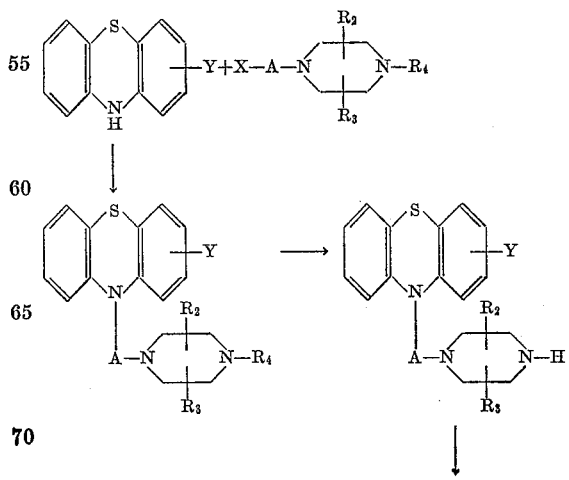

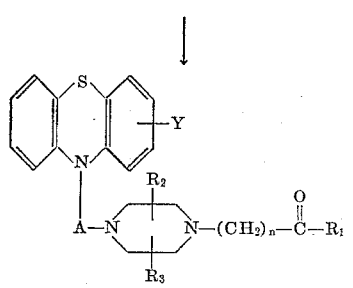

when X represents chlorine, bromine or iodine; Y, A, $R_1$, $R_2$, $R_3$, and $n$ are as defined above; and $R_4$ represents benzyl, formyl, carbobenzoxy, carbomethoxy or carbethoxy.

The substituted phenothiazine starting materials are prepared following known methods. Thus, a substituted 2-halo-2'-aminodiphenyl sulfide is cyclized in the presence of an acid-binding agent, for example sodium or potassium carbonate, and catalytic amounts of copper or copper bronze powder, by refluxing in dimethylformamide for from 6 to 19 hours.

Alternatively, the substituted phenothiazines are prepared from diphenylamines. In this method, appropriately substituted diphenylamines are heated with sulfur in the presence of a catalytic amount of iodine with or without a solvent at from 120 to 230° C. for from one to four hours.

As outlined above, the substituted phenothiazines are alkylated with an ω-haloalkylpiperazine having the free N-hydrogen of the piperazinyl moiety replaced by an easily removed moiety, $R_4$ as defined above. $R_4$ is preferably carbethoxy. The alkylation is achieved advantageously by refluxing an ω-haloalkylpiperazine, preferably chloro or bromo, and a substituted phenothiazine in a suitable inert aromatic solvent such as, preferably, benzene, toluene or xylene, in which at least one of the reactants must be soluble. A suitable acid-binding agent is usually included, such as an alkali metal amide, preferably sodium, potassium or lithium amide. The reaction mixture is refluxed for from 3 to 18 hours and worked up after cooling by adding an excess of water, extracting with dilute hydrochloric acid, neutralizing with base and extracting with benzene. Evaporation of the benzene extracts yields the residual base. The N-protective group, $R_4$ is then removed under mild conditions, such as by alkaline hydrolysis with for example sodium hydroxide solution in the case of the preferred carbethoxy group, to yield the substituted 10-piperazinylalkyl phenothiazines.

Another synthetic route to the 10-piperazinylalkyl phenothiazines is by means of 10-(ω-ester-alkyl)-phenothiazines which have a reactive end group on the 10-alkyl chain, for example an ω-tosylate or ω-chloro end groups, which can be reacted with a piperazine having one N-hydrogen replaced by $R_4$ as described above. For example, the ester and piperazine are refluxed in the presence of an acid-binder for a short period and further worked up as described above.

The substituted 10-piperazinylalkyl phenothiazine is then further reacted to prepare the compounds of this invention. Thus, the phenothiazine is reacted with an aroylalkyl halide of the formula,

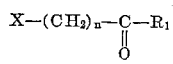

where X represents chlorine, bromine, or iodine, and $n$ and $R_1$ are as defined above. The reaction is carried out advantageously in a suitable inert organic solvent such as, preferably, a lower-carbon amide, for example dimethylformamide, by heating the reactants at from about 50–150° C. for from 30 minutes to 12 hours, preferably 1 to 8 hours. Alternatively, an acid-binding agent such as sodium or potassium carbonate is employed. The substituted 1-aroylalkyl-4-(10 - phenothiazinylalkyl) - piperazine is isolated by cooling the reaction mixture and pouring it into an excess of water. The mixture is made alkaline with dilute sodium hydroxide solution and extracted with chloroform. The dried chloroform extracts are evaporated to yield a residue which may be an oily base or a crystalline solid. The oily base is often purified by fractional distillation under high vacuum; the crystalline solid is purified by recrystallization. In practice the basic oil or solid is dissolved in an organic solvent and converted to a stable acid addition salt by reaction with a suitable organic or inorganic acid as described hereinbefore.

An alternative and advantageous method for the preparation of 1-aroylethyl-4-(10-phenothiazinylalkyl)-piperazines ($n$ representing 2 in Formula 1 above) employs the general reaction conditions of the Mannich reaction, namely the condensation of a carbonyl compound with formaldehyde and a secondary amine. Thus, a solution of an acetophenone of the formula,

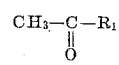

where $R_1$ is as defined above, paraformaldehyde and a substituted 10-piperazinylalkyl phenothiazine in a lower carbon alcohol such as ethanol is heated at reflux for from 3 to 6 hours in the presence of concentrated hydrochloric acid. Concentrating the cooled, filtered reaction mixture yields the dihydrochloride salt. The free base is isolated optionally by neutralizing an aqueous solution of the dihydrochloride salt, extracting with benzene or chloroform and evaporating the extracts to dryness in vacuo. The residual free base is purified or converted to another acid addition salt by methods described hereinbefore.

The foregoing is a general description of the main synthetic routes in the preparation of substituted 1-aroylalkyl-4-(10-phenothiazinylalkyl)-piperazines. It will be readily apparent to one skilled in the art that variations of these procedures are possible. Of particular advantage as preparative procedures are the methods thoroughly discussed above, namely, alkylation of substituted 10-piperazinylalkyl phenothiazines with an aroylalkyl halide or with an acetophenone and formaldehyde, and alkylation of substituted phenothiazines in the 10-position of the nucleus with an ω-haloalkylpiperazine having the free N-hydrogen of the piperazine moiety replaced by an easily removed group.

It will be readily apparent to one skilled in the art that certain of the compounds of this invention, notably those in which A is represented by an aliphatic carbon chain branched so that an asymmetric carbon atom is formed may be present as optical isomers. The connotation of the general formulae presented herein is to include all isomers, particularly the separated $d$ or $l$ optical isomers as well as the $dl$ mixture of these isomers. If desired, the isomers may be separated for individual use by separation methods known to the art, such as fractional crystallization, for instance, of the $d$-tartrate salts of the substituted 1-aroylalkyl-4-(10-phenothiazinylalkyl)-piperazine derivatives. Alternatively, a synthesis starting with an optically active side chain may yield the desired optical isomer.

The following examples are not limiting but are illustrative of compounds of this invention and the procedures for their preparation and will serve to make fully apparent all of the compounds embraced by the general formula given above and the preparation thereof respectively.

Example 1

A suspension of 13.4 g. of 2-trifluoromethylphenothiazine and 2.0 g. of sodium amide in 175 ml. of toluene is refluxed with rapid stirring for 15 minutes. A solution of 12.9 g. of N-carbethoxy-N'-(3-chloropropyl)-piperazine (prepared by reacting N-carbethoxypiperazine with 1 bromo-3-chloropropane) in 75 ml. of toluene is added and refluxing continued for six hours. The cooled reaction mixture is treated with 100 ml. of water and the toluene layer is extracted with dilute hydrochloric acid. The acid extracts are made basic with ammonia and then extracted with benzene. The benzene is removed by distillation in vacuo to yield the residual 10-[3-(N-carbethoxypiperazinyl) - propyl] - 2 - trifluoromethylphenothiazine.

A solution of 7.0 g. of 10-[3-(N-carbethoxypiperazinyl)-propyl]-2-trifluoromethylphenothiazine in 25 ml. of ethanol and 20 ml. of water containing 2 ml. of 40% sodium hydroxide solution is heated at reflux for two hours. The ethanol is distilled off in vacuo on the steam bath. The residue is treated with benzene-water and the dried organic layer evaporated in vacuo to give 10-(3-piperazinylpropyl)-2-trifluoromethylphenothiazine.

A solution of 13.0 g. of 10-(3-piperazinylpropyl)-2-trifluoromethylphenothiazine, 3.3 g. of acetophenone, 1.3 g. of paraformaldehyde, and 0.8 ml. of concentrated hydrochloric acid in 25 ml. of ethanol is stirred at reflux for one hour. An additional 0.9 g. of paraformaldehyde is added and refluxing is continued for three hours. The solid which forms is filtered and the filtrate concentrated. Upon the addition of 50 ml. of acetone and cooling, a pale yellow solid forms which is removed by filtration. This solid is recrystallized from ethanol to give pale yellow crystals of 1-(2-benzoylethyl)-4-[3-(2-trifluoromethyl - 10 - phenothiazinyl)-propyl]-piperazine dihydrochloride, M.P. 191–193° C.

*Example 2*

A mixture of 10.0 g. of phenothiazine, 2.1 g. of sodamide and 13.6 g. of N-carbethoxy-N'-(3-chloropropyl)-2-methylpiperazine (prepared by reacting the N-carbethoxy derivative of 2-methylpiperazine with 1-bromo-3-chloropropane) in 200 ml. of toluene is heated at reflux with stirring for eight hours. The cooled reaction mixture is worked up as in Example 1 to give 10-[3-(N-carbethoxy-2-methylpiperazinyl)-propyl]-phenothiazine.

A solution of 4.1 g. of the above phenothiazine derivative in 25 ml. of ethanol and 15 ml. of water containing 1 ml. of 40% sodium hydroxide solution is refluxed for two hours. The solvent is removed and the reaction mixture further treated as described in Example 1 to yield 10-[3-(2-methylpiperazinyl)-propyl]-phenothiazine.

A solution of 4.0 g. of α-chloro-p-methoxyacetophenone and 6.8 g. of 10-[3-(2-methylpiperazinyl)-propyl]-phenothiazine in 100 ml. of dimethylformamide is stirred and heated at 80° C. for four hours. The cooled reaction mixture is poured into water, made alkaline with 10% sodium hydroxide solution and extracted with chloroform. The dried chloroform extract is evaporated in vacuo to yield 1-(p-methoxybenzoylmethyl)-4-[3-(10-phenothiazinyl)-propyl]-2-methylpiperazine.

*Example 3*

A mixture of 11.6 g. of 2-chlorophenothiazine, 1.2 g. of lithium amide and 13.6 g. of N-carbethoxy-N'-(3-chloro-2-methylpropyl)-piperazine (prepared from the reaction of N-carbethoxypiperazine and 1-bromo-3-chloro-2-methylpropane) in 250 ml. of toluene is refluxed for eight hours and then worked up as in Example 1 to yield 10-[3-(N-carbethoxypiperazinyl)-2-methylpropyl]-2-chlorophenothiazine.

An ethanolic solution of 13.3 g. of the above-prepared phenothiazine with 30 ml. of water containing 3 ml. of 40% sodium hydroxide solution is refluxed for two hours. Removal of the solvent and treating the reaction mixture as described in Example 1 furnishes 2-chloro-10-(2-methyl-3-piperazinylpropyl)-phenothiazine.

A solution of 3.7 g. of 2-chloro-10-(2-methyl-3-piperazinylpropyl)-phenothiazine and 2.4 g. of β-bromopropiophenone in 75 ml. of dimethylformamide is heated at 100° C. for eight hours. Upon working up the reaction mixture as in Example 2, 1-(2-benzoylethyl)-4-[3-(2-chloro-10-phenothiazinyl)-2-methylpropyl]-piperazine is isolated.

Treating the free base with an ethyl acetate solution of bismethylene salicylic acid yields the bismethylene salicylate salt.

*Example 4*

A solution containing 11.3 g. of 10-(2-piperazinylethyl)-2-trifluoromethylphenothiazine and 6.5 g. of β-chloro-p-methoxypropiophenone in 150 ml. of dimethylformamide is stirred and heated at 100° C. for eight hours. The cooled reaction mixture is treated with water and made alkaline with dilute sodium hydroxide solution. The alkaline solution is extracted with chloroform and the extracts washed with water. The combined dried extract is evaporated in vacuo to yield 1-(p-methoxybenzoylethyl)-4-[2-(2-trifluoromethyl-10-phenothiazinyl) - ethyl]-piperazine.

The base is reacted with anhydrous hydrogen bromide gas in an ether solution to give the dihydrobromide salt.

*Example 5*

A suspension of 7.5 g. of 2-methylphenothiazine, 1.4 g. of sodamide and 7.3 g. of N-formyl-N'-(3-chloropropyl)-piperazine in 175 ml. of toluene is stirred and heated at reflux for eight hours. Water is added to the cooled reaction mixture, the organic layer separated and then extracted with dilute mineral acid. The acid extracts are made basic with ammonia and extracted with benzene. Removal of the solvent yields 10-[3-(N-formylpiperazinyl)-propyl]-2-methylphenothiazine. The formyl group is hydrolyzed in aqueous ethanol with 40% sodium hydroxide solution as outlined in Example 1.

A solution of 6.8 g. of 2-methyl-10-(3-piperazinylpropyl)-phenothiazine (obtained from above) and 4.3 g. of γ-chloro-p-methylbutyrophenone in 150 ml. of dimethylformamide is stirred and heated at 120° C. for eight hours. The cooled reaction mixture is treated as described in Example 2 to yield 1-(p-methylbenzoylpropyl)-4-[3-(2-methyl-10-phenothiazinyl)-propyl] - piperazine.

*Example 6*

A solution of 11.5 g. of 2-methoxyphenothiazine in 250 ml. of toluene is alkylated with 12.5 g. of N-carbethoxy-N'-(3-chloropropyl)-piperazine in the presence of 2.0 g. of sodium amide to yield 10-[3-(N-carbethoxy-piperazinyl)-propyl]-2-methoxyphenothiazine. This latter compound is then refluxed in an aqueous ethanol solution containing 40% sodium hydroxide solution to hydrolyze the carbethoxy group.

A solution of 8.9 g. of 2-methoxy-10-(3-piperazinylpropyl)-phenothiazine (prepared above) and 5.5 g. of α-bromoacetophenone in 150 ml. of dimethylformamide is stirred and heated at 60° C. for two hours. Treating the reaction mixture as in Example 2 and evaporating the chloroform extracts yields 1-benzoyl-methyl-4-[3-(2-methoxy-10-phenothiazinyl)-propyl]-piperazine.

*Example 7*

A mixture of 3.1 g. of 2-acetyl-10-(3-chloropropyl)-phenothiazine, 0.4 g. of sodium amide and 1.8 g. of N-carbethoxypiperazine in 150 ml. of toluene is stirred and refluxed for eight hours. The cooled reaction mixture is worked up as in Example 1 to yield 2-acetyl-10-[3-(N-carbethoxypiperazinyl)-propyl]-phenothiazine.

A solution of 13.1 g. of 2-acetyl-10-[3-(N-carbethoxypiperazinyl)-propyl]-phenothiazine in 50 ml. of ethanol and 30 ml. of water containing 3 ml. of 40% sodium hydroxide solution is refluxed for two hours. Working up the reaction mixture as in Example 1 yields 2-acetyl-10-(3-piperazinylpropyl)-phenothiazine.

A solution of 7.3 g. of 2-acetyl-10-(3-piperazinylpropyl)-phenothiazine and 4.7 g. of α-bromo-p-methylacetophenone in 125 ml. of dimethylformamide is heated at 80° C. with stirring for four hours. The cooled solution is worked up as in Example 2 to yield 1-(p-methylbenzoylmethyl)-4-[3-(2-acetyl-10-phenothiazinyl) - propyl]-piperazine.

The free base is treated with ethereal hydrogen chloride to give the dihydrochloride salt.

*Example 8*

A suspension of 9.8 g. of 2-methylmercaptophenothiazine and 1.6 g. of sodium amide in 150 ml. of toluene is refluxed and stirred for 30 minutes. A solution of 10.4 g. of N-carbethoxy-N'-(2-chloropropyl)-piperazine in 150 ml. of toluene is added and refluxing continued for eight hours. The cooled reaction mixture is treated as in Example 1 to yield 10-[2-(N-carbethoxypiperazinyl)-isopropyl]-2-methylmercaptophenothiazine. A solution of the phenothiazine in aqueous ethanol in the presence of 40% sodium hydroxide solution is refluxed for two hours to give the hydrolysis product, 2-methylmercapto-10-(2-piperazinylisopropyl)-phenothiazine.

A solution of 2.5 g. of γ-bromobutyrophenone and 3.7 g. of 2-methylmercapto-10-(2-piperazinylisopropyl)-phenothiazine in 75 ml. of dimethylformamide is stirred and heated at 130° C. for eight hours. Working up as outlined in Example 2 yields 1-(3-benzoylpropyl)-4-[2-(2-methylmercapto-10-phenothiazinyl)-isopropyl] - piperazine.

By reacting the free base dissolved in acetone with an acetone solution of citric acid, the dicitrate salt is formed.

*Example 9*

To a solution of 284.5 g. of 3-bromophenyl methyl sulfide in 1425 ml. of dry chloroform at 10° C., dry chlorine is introduced while the solution is irradiated with a 150 watt lamp. The reaction mixture is maintained at 15–18° C. for six and one-half hours. The reaction is stopped and a vigorous stream of nitrogen is introduced. The solvent is removed under pressure and the residue distilled to give a yellow oil, 3-bromophenyl trichloromethyl sulfide, B.P. 102–104° C./1.1 mm.

A mixture of 142.0 g. of 3-bromophenyl trichloromethyl sulfide and 110.0 g. of antimony trifluoride is heated in a distillation flask and the fraction boiling at 190–205° C. is collected. This fraction is dissolved in 800 ml. of ether and washed several times with 6 N hydrochloric acid and then water. The ether solution is dried and the solvent removed under reduced pressure. Distillation at atmospheric pressure yields a colorless liquid, 3-bromophenyl trifluoromethyl sulfide, B.P. 192–194° C.

A mixture of 160.0 g. of 3-bromophenyl trifluoromethyl sulfide, 100.0 g. of acetanilide, 52.9 g. of anhydrous potassium carbonate and 2.1 g. of copper-bronze powder is heated in an oil bath at a bath temperature of 220–230° C. for 24 hours. The cooled dark brown viscous mass is extracted with 750 ml. of acetone and the solvent removed under reduced pressure. To the dark brown residue, 180 ml. of concentrated hydrochloric acid in 515 ml. of ethanol is added. The mixture is refluxed for five hours and allowed to stand at room temperature over night. It is then poured into 2.5 liters of cold water and made just alkaline with 20% sodium hydroxide. Extraction with ether and removal of the dried solvent under reduced pressure gives a dark residue which is vacuum distilled to yield a pale yellow oil, 3-trifluoromethylmercaptodiphenyl amine, 115–119° C./0.3 mm.

A mixture of 117.0 g. of 3-trifluoromethylmercaptodiphenyl amine, 25.0 g. of sulfur and 1.8 g. of iodine is heated in an oil bath at 145–160° C. for one and one-half hours under a stream of nitrogen. The cooled reaction mass is dissolved in one liter of boiling benzene and treated with chromatographic alumina and charcoal. Concentration of the filtrate gives a solid, 2-trifluoromethylmercaptophenothiazine, which recrystallizes from carbon tetrachloride as yellow plates, M.P. 165–166° C.

A mixture of 29.9 g. of 2-trifluoromethylmercaptophenothiazine, 4.1 g. of sodamide and 25.7 g. of N-carbethoxy-N' - (3 - chloropropyl)-piperazine is stirred and heated at reflux for eight hours. Working up the reaction mixture as in Example 1 yields 10-[3-(N-carbethoxypiperazinyl)-propyl] - 2 - trifluoromethylmercaptophenothiazine which is hydrolyzed by heating for 90 minutes in an aqueous ethanol solution containing slightly less than one equivalent of sodium hydroxide.

A solution of 10.6 g. of 10-(3-piperazinyl-propyl)-2 - trifluoromethylmercaptophenothiazine (prepared as above), 4.0 g. of p-methylacetophenone, 2.0 g. of paraformaldehyde and 0.7 ml. of concentrated hydrochloric acid in 30 ml. of ethanol is stirred and refluxed for four hours. Working up the reaction mixture as described in Example 1 yields 1-(p-methylbenzoylethyl)-4-[3-(2-trifluoromethylmercapto-10-phenothiazinyl)-propyl]-piperazine dihydrochloride.

*Example 10*

A mixture of 6.9 g. of 2-methylsulfonylphenothiazine, 1.0 g. of sodamide and 8.0 g. of 3-chloro-1-(N-carbethoxy-2,5-diethylpiperazinyl)-propane (prepared from the reaction of 3-chloro-1-bromopropane with the N-carbethoxy derivative of 2,5-diethylpiperazine) in 150 ml. of toluene is heated at reflux for 10 hours. Cooling and working up as in Example 1 yields 10-[3-(N-carbethoxy-2,5 - diethylpiperazinyl)-propyl]-2-methylsulfonylphenothiazine. The latter compound is hydrolyzed by refluxing for two hours an aqueous ethanolic solution with 40% sodium hydroxide solution.

A solution of 4.6 g. of 2-methylsulfonyl-10-[3-(2,5-diethylpiperazinyl) - propyl] - phenothiazine (prepared as above) and 2.3 g. of β-bromopropiophenone in 50 ml. of dimethylformamide is heated at 100° C. for five hours. Working up the reaction mixture as in Example 2 yields 1-(2-benzoylethyl) - 4-[3 - (2 - methylsulfonyl-10-phenothiazinyl)-propyl]-2,5-diethylpiperazine.

*Example 11*

A solution of 12.0 g. of chromic anhydride, 12.0 g. of sulfuric acid and 40 ml. of water is mixed with 23.1 g. of 3-nitro-4-chlorophenyl trifluoromethyl sulfide and the resulting mixture is stirred for 15 hours at 120–130° C. Steam distilling the reaction mixture yields 3-nitro-4-chlorophenyltrifluoromethyl sulfone.

A solution of 4.0 g. of sodium hydroxide pellets in 30 ml. of water is added to 18.9 g. of 2-bromothiophenol dissolved in 250 ml. of ethanol and the resulting mixture added to a solution of 28.9 g. of 3-nitro-4-chlorophenyl trifluoromethyl sulfone in 100 ml. of ethanol. The suspension is refluxed for three hours. The solid present is filtered from the hot reaction mixture and washed several times with hot ethanol. The combined alcoholic filtrate is diluted with a small amount of water and cooled to yield 2' - bromo-2-nitro-4-trifluoromethylsulfonyldiphenyl sulfide.

A solution of 225.7 g. of stannous chloride crystals in 750 ml. of concentrated hydrochloric acid is carefully mixed with 44.2 g. of 2'-bromo-2-nitro-4-trifluoromethylsulfonyldiphenyl sulfide. The mixture is stirred and refluxed for five hours. The cooled reaction mixture is filtered and the separated solid metal complex is broken up by hydrolysis for one hour at reflux with 10% caustic soda and washed with benzene. The organic layer is separated and combined with further benzene washes. The solvent is then removed by distillation in vacuo and upon purification of the residue, 2'-bromo-2-amino-4-trifluoromethylsulfonyldiphenyl sulfide is obtained.

A suspension of 27.4 g. of 2'-bromo-2-amino-4-trifluoromethylsulfonyldiphenyl sulfide, 11.0 g. of anhydrous potassium carbonate and 0.5 g. of copper-bronze powder in 300 ml. of dimethylformamide is stirred and heated at reflux for 18 hours. The cooled reaction mixture is filtered and the filtrate diluted with water. The solid which thus forms is vacuum sublimed at 0.05 mm. (175–

195° C.) and recrystallized to give pure 2-trifluoromethylsulfonylphenothiazine.

A mixture of 3.3 g. of 2-trifluoromethylsulfonylphenothiazine, 0.4 g. of sodium amide and 2.6 g. of N-carbethoxy-N'-(3-chloropropyl)-piperazine in 100 ml. of toluene is heated at reflux for eight hours. The cooled reaction mixture is worked up following Example 1 to give 10 - [3 - (N-carbethoxypiperazinyl) - propyl]-2-trifluoromethylsulfonylphenothiazine.

A solution of 10.6 g. of 10-[3-(N-carbethoxypiperazinyl) - propyl]-2-trifluoromethylsulfonylphenothiazine in 60 ml. of ethanol and 20 ml. of water containing 2 ml. of 40% sodium hydroxide solution is refluxed for 90 minutes. Removing the solvent and treating as in Example 1 gives 10-(3-piperazinylpropyl)-2-trifluoromethylsulfonylphenothiazine.

A solution of 22.8 g. of 10-(3-piperazinyl-propyl)-2-trifluoromethylsulfonylphenothiazine, 9.0 g. of p-methoxyacetophenone, 3.2 g. of paraformaldehyde and 1.5 ml. of concentrated hydrochloric acid in 50 ml. of ethanol is stirred and heated at reflux for four hours. Working up the reaction mixture as outlined in Example 1 yields 1-(p-methoxybenzoylethyl) - 4 - [3-(2-trifluoromethylsulfonyl-10-phenothiazinyl)-propyl]-piperazine dihydrochloride.

*Example 12*

A mixture of 10.5 g. of 2-cyanophenothiazine, 1.9 g. of sodium amide and 12.1 g. of N-carbethoxy-N'-(3-chloropropyl)-piperazine in 200 ml. of toluene is stirred and refluxed for eight hours. Working up as in Example 1 yields 10-[3-(N-carbethoxypiperazinyl)-propyl]-2-cyanophenothiazine. The latter compound is hydrolyzed by refluxing an aqueous ethanol solution with 40% sodium hydroxide solution.

A solution of 7.0 g. of 2-cyano-10-(3-piperazinylpropyl)-phenothiazine (prepared as above) and 4.7 g. of β-bromopropiophenone in 75 ml. of dimethyl-formamide is stirred and heated at 100° C. for six hours. Working up the reaction mixture as in Example 2 yields 1-(2-benzoylethyl) - 4 - [3 - (2 - cyano - 10 - phenothiazinyl)-propyl]-piperazine.

A solution of the free base in ethyl acetate is treated with an ethyl acetate solution of maleic acid to give the dimaleate salt.

Reaction of the free base with sulfuric acid furnishes the sulfate salt.

What is claimed is:
1. 1 - (2 - benzoylethyl) - 4 - [3 - (2 - trifluoromethyl-10-phenothiazinyl)-propyl]-piperazine.
2. 1 - (2 - benzoylethyl) - 4 - [3 - (2 - trifluoromethyl - 10 - phenothiazinyl) - propyl] - piperazine dihydrochloride.

References Cited in the file of this patent

UNITED STATES PATENTS

| | | |
|---|---|---|
| 2,827,459 | Horclois | Mar. 18, 1958 |
| 2,874,155 | Cusic | Feb. 17, 1959 |
| 2,914,528 | Craig | Nov. 24, 1959 |
| 2,928,767 | Gulesich et al. | Mar. 15, 1960 |

FOREIGN PATENTS

| | | |
|---|---|---|
| 203,708 | Australia | Oct. 20, 1955 |
| 780,193 | Great Britain | July 31, 1957 |

OTHER REFERENCES

Craig: J. Org. Chem., vol. 22, pp. 709–711 (June 1957).